Sept. 11, 1934.  A. G. MARION ET AL  1,973,350
PULLEY
Filed Jan. 27, 1932

INVENTOR.
ALEXANDER G. MARION &
BY   WILLIAM WULF.
ATTORNEY.

Patented Sept. 11, 1934

1,973,350

UNITED STATES PATENT OFFICE 1,973,350

PULLEY

Alexander G. Marion and William Wulf, Detroit, Mich., assignors, by mesne assignments, to Vacuum Cup Metal Pulley Company, Detroit, Mich., a corporation of Michigan Application January 27, 1932, Serial No. 589,154

4 Claims. (Cl. 64—17)

Our invention relates to a new and useful improvement in a pulley or similar circular object over which a belt or other non-perforated driving member is passed for the purpose of rotating a pulley.

It is an object of the present invention to provide a pulley so constructed and arranged that a traction of the belt thereon will be secure and efficient and a slipping of the belt over the pulley will be prevented.

It is another object of the present invention to provide a pulley having a plurality of spaced pockets formed on its periphery to provide air pockets so that upon a displacement of the air therefrom by the traveling of the belt over the periphery of the pulley, a vacuum may be produced which will serve to prevent relative slipping of the belt and the pulley.

It is another object of the present invention to provide a pulley with a plurality of semi-spherical pockets formed in its periphery.

Other objects will appear hereinafter.

The invention consists in the combination and arrangement of parts hereinafter described and claimed.

Figure 1:
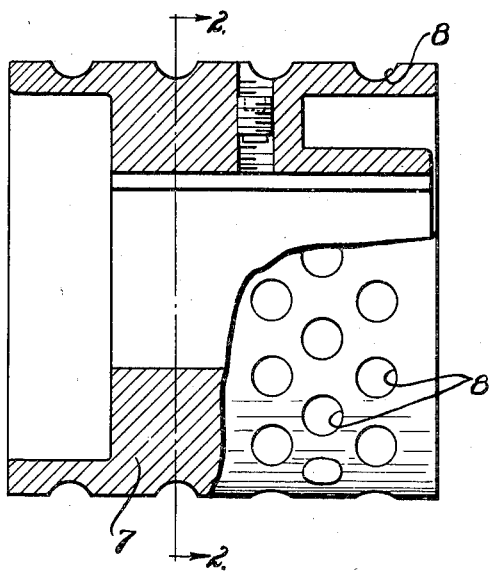
Figure 2:
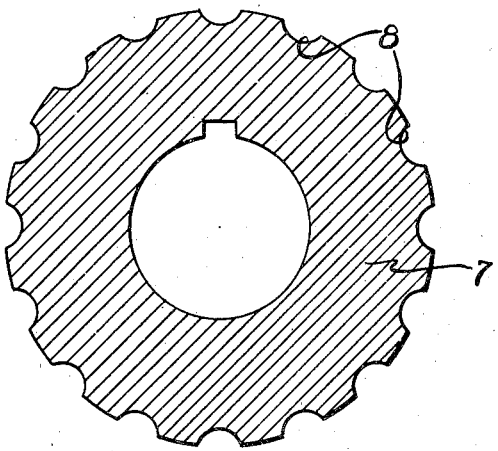

The invention will be best understood by a reference to the accompanying drawing which forms a part of this specification and in which Fig. 1 is a side elevational view of a pulley, embodying the invention with a part broken away and a part shown in section, Fig. 2 is a sectional view taken on line 2—2 of Fig. 1.

As shown in the drawing, the pulley 7 is provided on its periphery with a plurality of substantially semi-spherical pockets 8 which are in spaced relation to each other.

The belt when passing over the pulley will serve to force the air from the pockets 8 and thus the belt will be held closely against the periphery of the pulley 7 by means of atmospheric pressure resulting from the vacuum produced in the pockets 8. This will prevent a slipping of the belt over the pulley and result in a more efficient operation of the belt and the pulley with a consequent economy in operation as the loss of power resulting from the slippage is avoided. It has been found from experience that a more efficient operation of the device results when the pockets are formed of a spherical structure and it is preferred to form the pockets substantially semi-spherical although where the pockets are formed of less depth the spherical formation is maintained even though the pockets are not deep enough to define a hemisphere. This formation of the pockets permits the trapped air to cushion the belt as it travels around the pulley and serves to prevent injury to the belt by preventing engagement of the same with any sharp edges at the pockets. The depth of the pockets and the number of the pockets on the pulley will depend upon the size of the pulley and the load placed upon the belt as it is necessary that the displacement of air be sufficient to result in an atmospheric pressure forcing the belt against the pulley sufficiently to overcome the tendency to slip. With a pulley constructed in this manner, no belt dressing is necessary, and since most belt dressings shorten the life of the belt, it is obvious that an economy in belt costs results.

While we have illustrated and described the preferred form of construction, we do not wish to limit ourselves to the precise details of structure shown, but desire to avail ourselves of such variations and modifications as come within the scope of the appended claims.

Having thus described our invention what we claim as new and desire to secure by Letters Patent is:

1. A pulley having a plurality of non-communicating spaced pockets formed in its periphery and of spherical contour.

2. A pulley having a periphery and provided with a plurality of spaced semi-spherical pockets formed in said periphery to provide vacuum cups upon the passing of a belt thereover.

3. A pulley having a periphery provided with a plurality of non-communicating pockets tapering inwardly from the periphery and spaced around the circumference, the side walls of said pockets being inclined to the radius of the periphery.

4. A pulley having a periphery provided with a plurality of non-communicating pockets tapering inwardly from the periphery and spaced around the circumference, the side walls of said pockets being of curvilinear formation in cross section.

ALEXANDER G. MARION.
WILLIAM WULF.